UNITED STATES PATENT OFFICE.

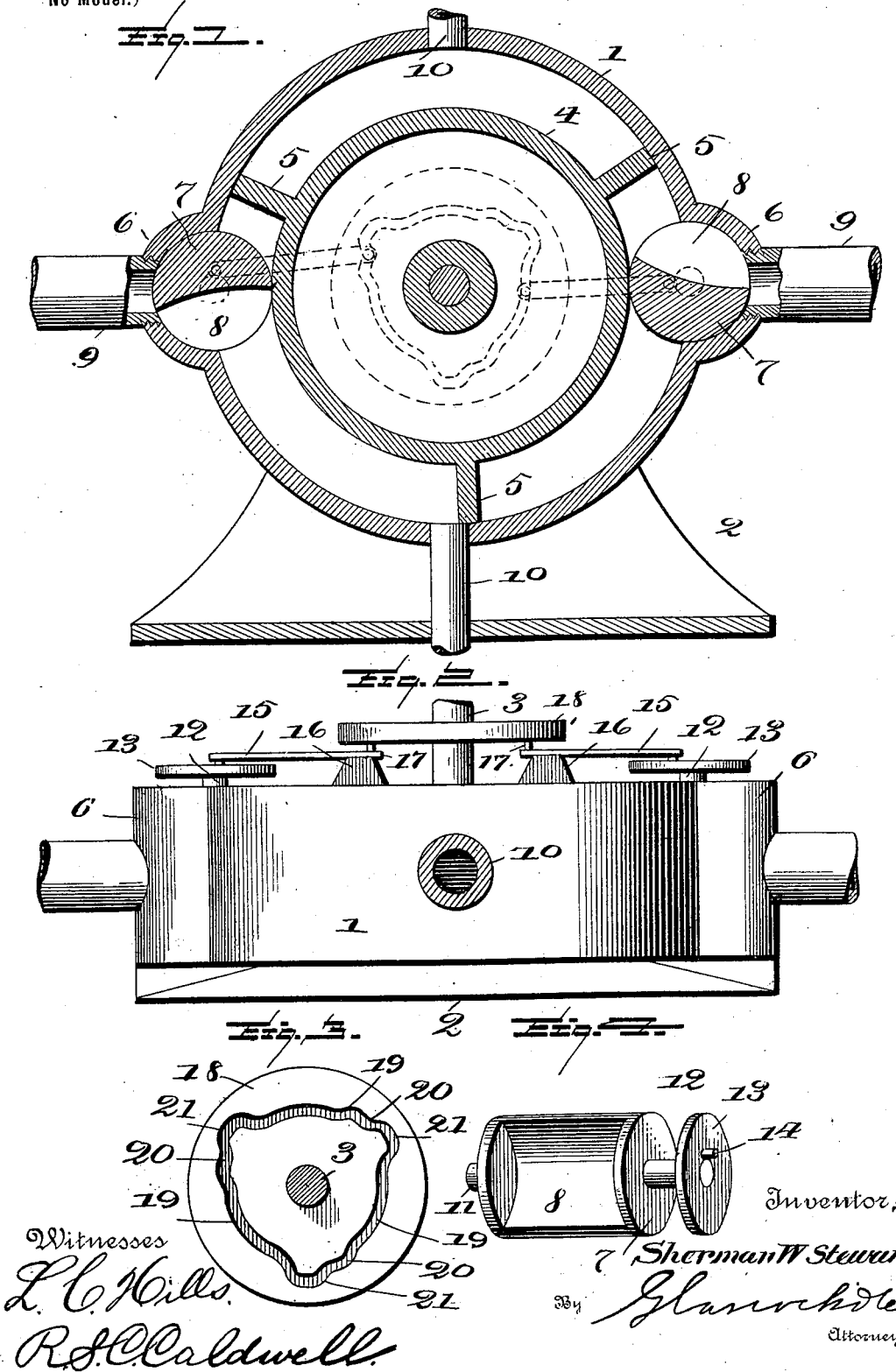

SHERMAN W. STEWART, OF MARENGO, INDIANA.

ROTARY ENGINE.

SPECIFICATION forming part of Letters Patent No. 631,943, dated August 29, 1899.

Application filed April 26, 1897. Serial No. 633,946. (No model.)

*To all whom it may concern:*

Be it known that I, SHERMAN W. STEWART, a citizen of the United States, residing at Marengo, in the county of Crawford, in the State of Indiana, have invented a new and useful Rotary Engine, of which the following is a specification.

My invention relates to certain new and useful improvements in rotary steam-engines, and has for its object to produce an engine of this character comprising a cylinder in which is journaled a circular piston having radial wings completely closing the annular space between the cylinder and the piston, the said cylinder being provided with inlet and outlet ports and cut-offs to regulate same journaled in the cylinder over the inlet-ports, being of crescent shape in cross-section and adapted to be operated by a cam of concentric surfaces at three different pitches, so that the first closes the annular space on one side thereof and admits steam to the other side, the second shutting off this flow of steam without opening the annular space, and the third opening said space to permit of the radial wings passing.

With these and other objects in view my invention further consists in the novel details of construction and combination of parts to be clearly described in the following specification and fully set forth in the claim.

Referring to the accompanying drawings, forming a part of this specification and in which like characters of reference indicate similar parts thoughout, Figure 1 is a vertical section of my improved engine. Fig. 2 is a plan view thereof. Fig. 3 is a side elevation of the cam-wheel, and Fig. 4 is a perspective view of one of the cut-offs with its pitman-wheel.

In the drawings, 1 represents a cylindrical casing mounted on a suitable base or foundation 2 and having journaled centrally therethrough a shaft 3, on which is secured a cylindrical piston 4 of somewhat smaller diameter than the cylinder, leaving an annular space therebetween, and provided with three equal distant radial wings 5, completely bridging across this annular space and dividing it into three uniform sections. At the sides of the casing 1 there are curved offsets 6, in which are seated and journaled cylindrical cut-offs or valves 7, which extend across the annular space to close same between the wings and are provided with intermediate curved cut-away portions 8 in one side, adapted when in proper adjustment to aline with the inner wall of the cylinder to allow the wings 5 to pass, and in these offsets 6 are threaded the ends of feed-pipes 9, which are opened and closed by the cut-away portions 8 of the cut-offs, while exhaust-pipes 10 lead from the top and bottom of the casing at right angles to the feed-pipes. Each cut-off is journaled in its offset by means of an annular lug 11 at one end fitting within a suitable seat (not shown) in one side of the casing and a shaft 12 on its other end passing through the other side of the casing. The shaft 12 is provided on its outer end with a pitman-wheel 13, carrying an offset wrist-pin 14, and a pitman 15 is slidable in a guide 16 and journaled at its outer end on the wrist-pin 14, with its inner end carrying an outwardly-projecting pin 17, which is adapted to slide in the cam-groove of a cam-wheel 18, mounted on the shaft 3. The groove of the cam-wheel 18 is formed of three similar sections, each consisting of three concentric portions of different diameters, each merging into the next, the first portion 19 being of shortest diameter and extending over the major part of the section and determining the position of the valve in which it closes one side of a section of the annular space and admits steam to the other side thereof, as shown to the right of Fig. 1, the second portion 20 being of intermediate diameter and extending for a comparatively short distance, determining the position of the valve in which it shuts off the entrance of steam without opening the annular space, as shown to the left of Fig. 1, and the third portion 21 being of greatest diameter and also extending for merely a short distance, determining the position of the valve in which its cut-away portion 8 lies in alinement with the inner wall of the cylinder.

During the first step, while the pin 17 travels in the first section of the groove 19, steam is admitted to one side of the wing which has just passed the valve in question, and the space on the other side of said wing being open to the atmosphere through an exhaust-pipe 10 the wing will be caused to revolve in the direction of said exhaust-pipe and in the meantime turning the shaft 3 with the cam-wheel 18. When the wing has nearly reached the exhaust-pipe, the second step takes place by the pin 17 riding in the second section of the groove 20, causing the valve to assume a position in which while it shuts off the entrance of the steam it does not open the annular space, thus utilizing the expansion of the steam before the wing reaches the exhaust. A further revolution of the piston, caused by the steam acting on the other wings, carries the wing beyond the exhaust-pipe, allowing the escape of the steam in the section therebehind, when the third step is brought about by the pin 17 riding into the third section of the groove 21, causing the valve to be thrown so that its cut-away portion 8 registers with the inner wall of the cylinder, allowing the next wing to pass, when the pin 17 rides to the succeeding section 19 of the cam-groove, throwing the cut-off to its first step, and the cycle of operation is continuously repeated.

It will be noticed that because of the three-sectioned arrangement while one wing has just passed the exhaust, so that the force behind it becomes useless in propelling it farther, the next preceding wing is undergoing the first step and so the movement is not lost, but each wing helps to bridge the others over their inactive periods.

It is obvious that a fly-wheel should be secured on the shaft 3 to insure steady running; but as these are common with most forms of engines and as the ring of the piston may be made of sufficient weight to serve the purpose thereof I have omitted same in this application; but this and other changes in the arrangement and construction of the parts are clearly within the spirit of my invention and may be resorted to without departing from the scope thereof.

Having thus described my invention, what I claim as new, and desire to secure by Letters Patent, is—

In a steam-engine, a cylinder, chambers connected with the cylinder and provided with steam-ports, a revolving piston journaled within the cylinder, wings projecting from the piston and closing the space between the piston and the cylinder, cut-offs journaled within the chambers and provided with curved openings adapted to register with the contour of the cylinder and allow the wings to pass, pitman-wheels secured on the shafts of the cut-offs, wrist-pins on the pitman-wheels, a cam-wheel secured on the shaft of the piston, said cam-wheel containing a groove arranged concentrically at three different distances from the center of the wheel, pitmen journaled on the wrist-pins, guides in which said pitmen slide, pins on the pitmen adapted to slide in the groove of the cam-wheel to be operated thereby and revolve the cut-offs, the first of said concentric portions of the groove being adapted to hold the cut-offs in such a position that their curved openings connect the steam-ports with the space between the piston and the cylinder on one side of the cut-offs, while the said space on the other side of the cut-offs is closed by the outer edges of the cut-offs, the second of said concentric portions of the cam-groove being adapted to hold the cut-offs in a position to close the ports without opening the space between the piston and the cylinder, and the third of the said concentric portions of the cam-groove being adapted to hold the cut-offs in a position in which their curved openings register with the contour of the cylinder without opening the ports, substantially as described.

SHERMAN W. STEWART.

Witnesses:
   CURTIS E. WEATHERS,
   ANDREW J. STEWART.